Aug. 20, 1968   P. J. W. H. M. BONGERS   3,397,931
SLIDE BEARING

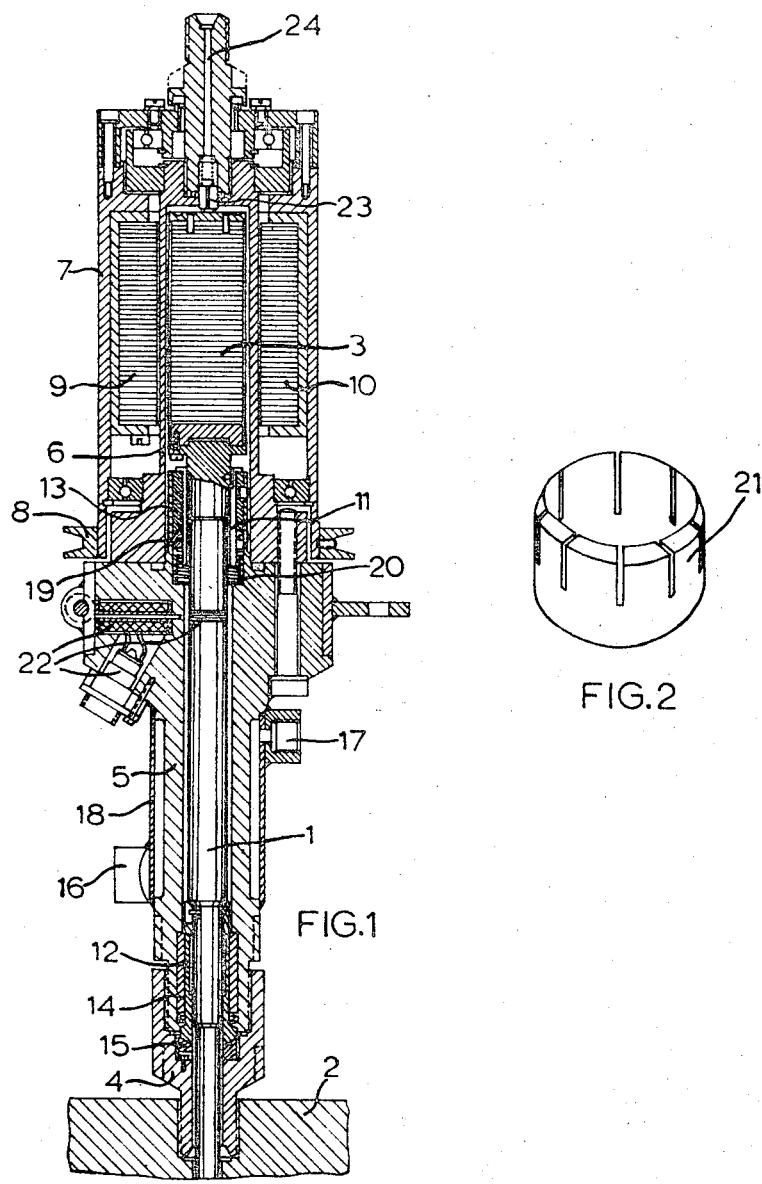

Filed June 29, 1966   2 Sheets-Sheet 2

INVENTOR
PAUL J. W. H. M. BONGERS

BY Cushman, Darby & Cushman
ATTORNEYS 3,397,931
SLIDE BEARING
Paul J. W. H. M. Bongers, Beek, Limburg, Netherlands, assignor to Stamicarbon N.V., Heerlen, Netherlands
Filed June 29, 1966, Ser. No. 561,546
Claims priority, application Netherlands, June 30, 1965, 6508371
7 Claims. (Cl. 308—141)

ABSTRACT OF THE DISCLOSURE

The bearing assembly includes a slide bearing for a shaft provided with a cup-shaped surface for centering the shaft and a fixed cylindrical supporting surface around the shaft with so much clearance that it does not serve as a running surface when the shaft is centered so that in normal smooth operation the supporting surface will not wear. The supporting surface allows the shaft to be only slightly eccentric. If the shaft is eccentric, the supporting surface is temporarily loaded and the cup-shaped surface provides for a rapid centering of the shaft.

---

The present invention relates to bearing assemblies and more particularly to a shaft slide bearing assembly having a cup-shaped shaft centering surface and a cylindrical, radially inwardly facing guide surface about the shaft having so much clearance with respect to the shaft that it does not serve as a running surface when the shaft is centered.

It is commonly known that, under certain circumstances, for instance with radially unloaded bearings of a given bearing-shaft clearance, vertically rotating shafts show some instability which may cause the shafts to vibrate. If the drive torque is greater than the counter-torque, of the vibrating shaft, this manifests itself in a more rapid wear of the bearings. If the drive torque is smaller than the counter-torque the shaft is braked, so that it will come to a standstill. In general, this vibration phenomenon is more likely to occur in non-lubricated bearings than in lubricated bearings.

The above-mentioned difficulties are encountered in gas-lubricated bearings, which are used among other places in astronautical engineering. With this type of bearings the locus of the center of the shaft may, at a given rotational speed, describe a circle at a number of revolutions that is approxiamtely half the number of revolutions of the shaft, the diameter of the said circle being twice as large as the clearance between the shaft and the bearing. This phenomenon is known as half-frequency whirl. In non-lubricated bearings the vibration may comprise a precession of the shaft center in the opposite direction to the rotation of the shaft.

Much effort has been expended to minimize the difficulties brought on by such vibration. Such minimization efforts have heretofore brought forth suggestions of avoiding difficulties by using the smallest possible play of the shaft in the bearings; by providing a directed external radial load; by providing a damping medium (lubricating film) between bearing and shaft; by using a shaft with the largest possible mass; by balancing the shaft as well as possible; by making the shaft as circular as possible, and finally, by making the shaft and bearing of materials which together, give the highest possible wear resistance, so that the clearance increases as little as possible.

Attempts to design a construction which gives satisfactory results under all conditions have not been successful so far.

It is an object of the invention to provide a very suitable bearing assembly for overcoming such difficulties, the bearing assembly comprising a slide bearing for a shaft provided with a cup-shaped surface for centering the shaft and a fixed cylindrical supporting surface around the shaft with so much clearance that it does not serve as a running surface when the shaft is centered so that in normal smooth operation the supporting surface will not wear. The supporting surface allows the shaft to be only slightly eccentric. If the shaft is eccentric, the supporting surface is temporarily loaded and the cup-shaped surface provides for a rapid centering of the shaft.

These and other objects of the present invention as well as the principles and more of the scope thereof will become more clearly apparent during the course of the following detailed discussion.

As more play is allowable in bearings according to the present invention than in conventional bearings, the supporting surface may be made of wear-resistant plastics material having a high thermal expansion coefficient, such as the commercial material known by the name of Teflon (a polytetrafluoroethylene of the Du Pont Co.). To improve the thermal conductivity, the material may be mixed with other materials such as graphite.

Use may also be made in the bearing of the present invention, of substances that have a high moisture-absorbing capacity and which expand upon absorption of moisture, such as nylon, which is more resistant to wear under certain conditions than are Teflon compositions.

A perfectly dry-running bearing according to the present invention with a play of approximately 0.1 mm. was successfully tested under very difficult circumstances indeed where conventional devices with the same play failed. This test was made on a rotating stirrer for an autoclave, in which the stirrer shaft was driven by magnetic transmision in a pressure resistant housing (300 atm. gauge). Absolutely no lubricant, such as oil or grease, was allowed to enter into the reaction vessel during stirring at a speed of 2,000 revolutions per minute. The use of stuffing boxes was not permitted on the particular autoclave, for further assurance that no reactants could escape the vessel. All parts had to be highly resistant to corrosion.

Fabrication of a preferred embodiment of the bearing of the present invention includes mounting slide blocks around the shaft which are capable of sliding axially and are made to press against the cup-shaped surface by spring action, so that they have a stabilizing effect. The advantage of this construction is that the production of the axial pressure on the cup-shaped surface which pressure is required to center the shaft, does not depend on the weight, and possibly, an axial displacement of the shaft. In the case of a vertical shaft with an upper and a lower bearing, the weight of the shaft and accessories may be made to rest on the cup-shaped surface of one of the bearings if there is no danger of the shaft being axially displaced and the spring action may be used to provide the pressure against the cup-shaped surface of the other bearing not only when the pressure acts in the same direction as gravity, but also when the pressure acts in a direction opposed to gravity.

By preference, the said slide blocks are fixedly mounted so as to be not rotatable. They consequently form a cylindrical running surface, whereas the cup-shaped surface is not a running surface.

If the shaft is eccentric, the slide blocks slightly move along the cup-shaped surface, which surface need no longer be an uninterrupted conical or spherical solid of revolution. The section perpendicular to the shaft may now be a polygon and the surface may be interrupted.

It is preferred that the spring action be supplied by a single spring element fitted around the shaft so that the spring action is equally large for all slide blocks, which is necessary to obtain a proper centering of the shaft. The spring in the embodiment described hereinafter is a helical spring, but a sleeve of a suitable elastic material could be substituted therefor.

An axially shorter bearing is obtained when the slide blocks are mounted in recesses in the supporting surface.

The slide blocks may be separate bodies. To facilitate assembly and disassembly, it is useful in cases where the choice of materials so permits to use for slide blocks a cylindrical sleeve made of a slightly elastic material and provided with axial incisions.

The invention will now be further elucidated with reference to the drawing, where:

FIGURE 1 is a longitudinal sectional view showing a bearing assembly according to the present invention used on a stirrer shaft;

FIGURE 2 is a perspective view showing a variant of the slideblocks of FIGURE 1.

Figure 3:
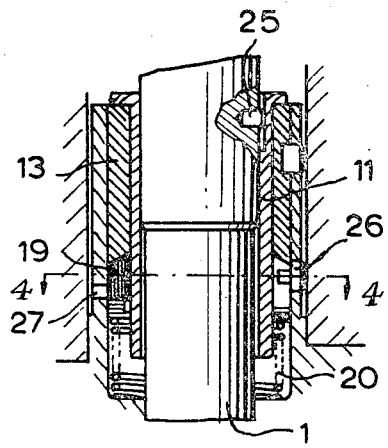
FIGURE 3 is a longitudinal sectional view of the upper bearing on a larger scale.
Figure 4:
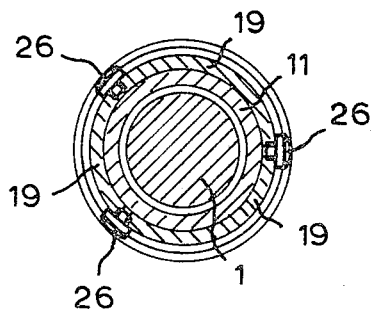
FIGURE 4 is a cross-sectional view of the upper bearing taken along line 4—4 of FIGURE 3.
Figure 5:
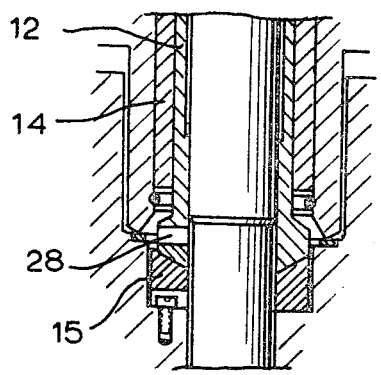
FIGURE 5 is a longitudinal sectional view of the lower bearing on a larger scale.

In FIGURE 1, a stirring element is connected to the lower end of a shaft 1 and is placed in an autoclave, the upper wall 2 of which is shown in FIGURE 1. The shaft 1 is driven by means of a magnetic transmission. For this purpose, the upper end of shaft 1 is fitted with a permanent magnet 3. The shaft 1 and the magnet 3 are enclosed in a fully closed, pressure-resistant housing which is formed by sleeves 4 and 5 and a cap 6, which are firmly connected together while sleeve 4 is fitted in and secured to the autoclave wall 2. A sleeve 7 is rotatably connected to the top of cap 6. This sleeve, which is driven with the aid of a sheave 8, surrounds two magnets 9 and 10 which must be capable of turning the magnet 3 against a couple of 12 kilogram-centimeters.

As the shaft 1 and the magnet 3 are mounted in a fully closed housing, the use of stuffing boxes has been avoided; the pressure in the housing is similar to that in the autoclave. The stirrer shaft 1 must have perfectly dry-running bearings so that there is no lubricant to affect or be affected by the reactants in the autoclave. For this purpose slide bearings according to the present invention are most suitable, as ball bearings of a non-lubricated type can hardly be used at the said high number of revolutions (2,000 r.p.m.). The shaft 1 is shown provided with co-rotating sleeves 11 and 12, which may be made of material such as stainless, chrome-hardened steel. Fixed sleeves 13 and 14, which form cylindrical supporting surfaces, are mounted in sleeve 5 opposite the sleeves 11 and 12. These fixed sleeves 13 and 14 may advantageously be made of the above-mentioned Teflon which is optionally mixed with graphite. As has already been stated, use may also be made of nylon or the like in fabricating these. As the volume of these substances may change, a clearance is required to prevent jamming. In the bearings according to the invention, this clearance is provided for so that the inner surfaces of the sleeves 13 and 14 are supporting surfaces and not running surfaces.

In the bottom bearing, a ring 15, of Teflon or the like is fixed in sleeve 4. The conical upper surface of this ring co-operates with the conical lower surface of the sleeve 12. Consequently, these conical surfaces form the running surfaces proper. The pressure needed for the centering of the shaft is produced by the weight of the stirrer shaft and accessories.

The ring 15 and the sleeve 14 can be constructed as one unitary part in which case the part corresponding to the sleeve 14 can advantageously be provided with axial slots adjacent and proceeding to one end thereof. The constructional whole of ring and sleeve can then be easily replaced.

The connections 16, 17 and a jacket 18 shown in FIGURE 1 provide a liquid cooling system. Yet temperature variations between room temperature and 60° C. must be taken into account in the upper bearing, the sleeve 13 of which is undivided, as Foucault currents in the cap 6 form a source of heat. The bottom of the supporting surface of sleeve 13 is provided with three recesses, 120° apart, in which slide blocks 19 are mounted. The slide blocks and also the recesses have oblique top surfaces, which may be either flat, conical, spherical or similarly symmetrically curved.

The blocks are made of graphitized carbon. In this embodiment the running surfaces are between the blocks 19 and the sleeve 11. A spring 20 mounted in sleeve 5 presses the blocks upwards and, on account of the oblique surfaces, inwards against sleeve 11.

The blocks 19 may also be formed by a unitary sleeve 21, as shown in FIGURE 2. This sleeve may be made, for instance, of Teflon mixed with carbon.

The numeral 22 denotes an electromagnetic speed detector which may be used to check the speed of the shaft. Static electricity can be discharged by means of a carbon brush 23. The space between the cap 6 and the sleeves 5 and 4, can be flushed through channel 24.

The bearings according to the invention are very simple to manufacture and easy to fit and remove. The wear is very low and does not readily give rise to vibration of the shaft. Jamming of the shaft is impossible.

It should now be apparent that the invention as described hereinabove accomplishes the objects of the invention set forth at the outset of the specification and clearly illustrate the principles and scope of applicability of the invention. Because the embodiments shown in the drawings can be considerably modified without departing from these principles the invention should be interpreted as encompassing all such modifications as are within the spirit and scope of the following claims.

I claim:

1. A slide bearing for a rotatable shaft said slide bearing comprising: means defining a bearing element having a cup-shaped surface defined thereon, constructed and arranged to axially center a rotatable shaft; and a fixed non-rotative bearing element having means defining a generally cylindrically curved surface thereon having so large a diameter as to be out of contact with said rotatable shaft at all times except when said rotatable shaft is eccentric to a predetermined extent with respect to said cup-shaped surface; a plurality of slide blocks constructed and arranged to at least intermittently circumferentially surround said rotatable shaft, said slide blocks being axially slidable with respect to the bearing element having said cup-shaped surface and engaging said cup-shaped surface; means resiliently urging said slide blocks against said cup-shaped surface.

2. The slide bearing of claim 1 further including means preventing rotation of said slide blocks with respect to the rotatable shaft.

3. The slide bearing of claim 2 wherein the last-mentioned means comprise means defining angularly spaced recesses in said cylindrically curved surface, said slide blocks being received in said recesses.

4. The slide bearing of claim 1 wherein said resiliently urging means comprises a single helical spring constructed and arranged to circumferentially surround the rotatable shaft; and said spring bearing against each of said slide blocks.

5. The slide bearing of claim 1 wherein said slide blocks are defined by axially extending, integral, angularly spaced extensions of an annular sleeve of slightly elastic material.

6. In pressure vessel apparatus adapted to contain subatmospheric or super-atmospheric pressure: means defining a shaft support housing on a vessel, fully closed with respect to the exterior of the vessel, and communicating with the interior of the vessel; a rotatable shaft received at one end thereof in said shaft support housing and protruding into the said vessel; and a slide bearing assembly in said housing surrounding said shaft near said shaft one end, said slide bearing including: means defining a sleeve fixedly mounted in said housing surrounding said shaft, means defining a generally axially facing cup-shaped surface on said sleeve; a plurality of slide blocks at least intermittently circumferentially surrounding said rotatable shaft; means in said housing preventing rotation of said slide blocks while allowing limited axial and radial movement thereof; means defining a surface on each slide block in engagement with said cup shaped surface; resilient means mounted in said housing in engagement with each slide block and resiliently urging said slide blocks toward said cup-shaped surface, said cup-shaped surface thereby cooperatively providing centering means for said rotatable shaft; and a bearing element fixedly, non-rotatively mounted within said housing and having means defining a generally cylindrically curved, radially inwardly facing surface thereon circumferentially surrounding said rotatable shaft and having so large a diameter as to be free of contact with said rotatable shaft at all times during rotation of said rotatable shaft except when said rotatable shaft is eccentric to a predetermined extent with respect to said cup-shaped surface, whereby upon becoming eccentric to said predetermined extent, said shaft temporarily engages said generally cylindrically curved radially inwardly facing surface until said cup-shaped surface so cooperatively recenters said rotatable shaft as to reduce the eccentricity thereof below said predetermined extent.

7. The pressure vessel apparatus of claim 6 wherein said slide bearing is essentially free of lubricant.

References Cited

UNITED STATES PATENTS 1,739,362   12/1929   Kingsbury _____ 308—160

MARTIN P. SCHWADRON, *Primary Examiner.*

F. SUSKO, *Assistant Examiner.*